(12) United States Patent  (10) Patent No.: US 6,658,165 B1
Choi  (45) Date of Patent: Dec. 2, 2003

(54) CONTRAST ENHANCING APPARATUS FOR VIDEO SIGNAL

(75) Inventor: Sang Um Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/473,144

(22) Filed: Dec. 28, 1999

(30) Foreign Application Priority Data

Dec. 31, 1998 (KR) .......................................... 1999/63193
Nov. 10, 1999 (KR) .......................................... 1999/49632

(51) Int. Cl.$^7$ ............................................... G06K 9/40
(52) U.S. Cl. ...................................... 382/274; 382/263
(58) Field of Search ................................. 382/274, 114, 382/263; 348/606, 625; 345/8

(56) References Cited

U.S. PATENT DOCUMENTS

| 4,187,519 A | * | 2/1980 | Vitols et al. | 358/169 |
| 4,204,226 A | * | 5/1980 | Mistretta et al. | 358/111 |
| 4,829,380 A | * | 5/1989 | Iadipaolo | 358/166 |
| 5,359,675 A | * | 10/1994 | Siwoff | 382/114 |
| 5,546,135 A | * | 8/1996 | Okamoto et al. | 348/674 |
| 6,172,718 B1 | * | 1/2001 | Alvarez et al. | 348/625 |

OTHER PUBLICATIONS

Schulze et al., "A morphology–Based Filter Structure for Edge–Enhancing Smoothing", IEEE International Conference, vol. 2, Nov. 1994, pps. 530–534.*

* cited by examiner

*Primary Examiner*—Anh Hong Do
(74) *Attorney, Agent, or Firm*—Fleshner & Kim, LLP

(57) ABSTRACT

The present invention relates to a contrast enhancing apparatus for a video signal which is capable of enhancing a coefficient characteristic of a light and dark portion of a video signal in a video display apparatus such as TV, etc. In the conventional art, since the attenuating and amplifying coefficients of a low frequency component and a high frequency component are uniformly fixed for enhancing a contrast of a video signal, so that it is impossible to significantly enhancing a contrast of all kinds of videos. In addition, since a transition of a DC level occurs due to an attenuation of the low frequency component, the final output must be scaled again, and the minimum and maximum values of the signal component must be obtained. However, in the present invention, the coefficient which is varied based on the levels of the high frequency component and low frequency component for enhancing the low frequency component separated from the video signal, and the low frequency level is compensated with the thusly determined coefficient, and a coefficient which is in inverse proportion to the enhancement of the low frequency component. Therefore, in the present invention, it is possible to enhance the contrast based on the video signal which is inputted in real time by uniformly varying the enhancing coefficients of the high frequency component and the low frequency component based on a user control signal.

15 Claims, 5 Drawing Sheets

CONTRAST ENHANCING APPARATUS FOR VIDEO SIGNAL

BACKGROUND OF THE INVENTION

1. Field of the Invention

The present invention relates to a contrast enhancing apparatus for a video signal, and in particular to a contrast enhancing apparatus which is capable of significantly enhancing a contrast of a video signal by enhancing (amplifying or attenuating) a video signal inputted.

2. Description of the Background Art

In a method for enhancing a contrast of a video signal, a boundary portion of a video signal is selected, and the boundary portion is enhanced for thereby enhancing a contrast of the same. In another method therefor, a light and darkness ratio between a light portion and a darkness portion is enhanced using a homomorphic filter for thereby enhancing a contrast.

As shown in FIG. 1, the contrast enhancing apparatus of a video signal formed of a conventional homomorphic filter includes an algebraical conversion unit 100 for converting a video signal Yin into an algebra form (log), a wave filtering unit 200 for separating an algebraically processed video signal Ylog1 into a low frequency component Y1pf1 and a high frequency component Yhpf1, a first multiplier 300 for attenuating the low frequency component Y1pf1 using an attenuation coefficient "a", a second multiplier 400 for amplifying the high frequency component Yhpf1 using an amplifying coefficient "b", a summing unit 500 for summing the attenuated low frequency component Y1pf1 and the amplified high frequency component Yhpf1, and an exponential conversion unit 600 for converting the signal Ylog2 summed by the summing unit 500 to a video signal.

The operation of the conventional contrast enhancing apparatus for a video signal will be explained with reference to the accompanying drawings.

First, the video signal Yin inputted from the algebraical conversion unit 100 is algebraically processed, and the thusly algebraically processed video signal Ylog1 is divided into the low frequency component Y1pf1 and the high frequency component Yhpf1 by the wave filtering unit 200. At this time, the low frequency component Y1pf is multiplied by the attenuating coefficient "a" and is attenuated by "a" times for enhancing the contrasts of the low frequency component Y1pf1 and the high frequency component yhpf1, and the high frequency signal Yhpf1 is amplified by the second multiplier 400 by the amplifying coefficient "b". Here, since the attenuating coefficient "a" and the amplifying coefficient "b" have fixed values, the contrast of the video signal Yin is enhanced by uniformly attenuating or amplifying the inputted low frequency component Y1pf1 and the high frequency component Yhpf2.

In addition, since the signal Ylog1 that the low frequency component Y1pf1 attenuated by the first multiplier 300 and the high frequency component Yhpf1 amplified by the second multiplier 400 are summed by the summing unit 500 is an algebraically converted signal, the signal is inputted into the exponential conversion unit 600 and is exponentially converted and is recovered as a video signal Yout.

Therefore, in the homorphic filter, the contrast of the video signal is enhanced by attenuating the low frequency component Y1pf1 of the input video signal Yin and amplifying the high frequency component Yhpf1 using the fixed amplifying or attenuating coefficients "a" and "b". However, since the above-described coefficients "a" and "b" have a fixed value, all video signals are amplified or attenuated by the fixed values, it is impossible to properly enhance the contrast of all video signals.

In addition, in the method in which the coefficients "a" and "b" are differently set in accordance with the video signal Yin, it is difficult to adapt in real time, and in the case that the low frequency component Y1pf1 is attenuated, since a transition of the DC level occurs, the final output Yout must be scaled again, and the minimum and maximum values of the signal component must be obtained, so that a real time process is not implemented.

Since the video sinal is not processed in a real time, it is impossible to uniformly enhance the contrast of the video signal.

SUMMARY OF THE INVENTION

Accordingly, it is an object of the present invention to provide a contrast enhancing apparatus for a video signal which is capable of determining an enhancing coefficient of the low frequency component using a high frequency component level and a low frequency component level in a method for enhancing the low frequency component of the video signal, compensating the thusly determined coefficient using a DC level, obtaining a low frequency component, and the determining the enhancing coefficient of the high frequency component based on the enhancing coefficient of the low frequency component. In addition, the enhancing coefficient of the high frequency component and the enhancing coefficient of the low frequency component are given an off-set value in accordance with a control signal of a user, so that it is possible to enhance a light darkness ratio by variably amplifying or attenuating the contrast of the video signal in accordance with the levels of the high frequency component and low frequency component.

To achieve the above objects, there is provided a contrast enhancing apparatus for a video signal which includes an algebraical conversion unit for algebraically converting an inputted video signal, a wave filtering unit for separating the algebraically converted video signal into a low frequency signal and a high frequency signal, a low frequency coefficient mapping unit for generating a level of a high frequency signal which is an output of the wave filtering unit and a level of the low frequency signal and a low frequency enhancing coefficient based on a user's adjustment, a high frequency coefficient mapping unit for generating a high frequency enhancing coefficient which is in inverse proportion to the low frequency enhancing coefficient, a first multiplier for multiplying the low frequency signal and the low frequency enhancing coefficient, a low frequency signal processing compensation unit for receiving an output of the low frequency mapping unit and an output of the first multiplier and compensating a low frequency level, a second multiplier for multiplying the high frequency signal and the high frequency enhancing coefficient, a summing unit for summing an output of the low frequency amplifying compensation unit and an output of the second multiplier, and an exponential conversion unit for exponentially converting an output of the summing unit.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The contrast enhancing apparatus for a video signal according to the present invention includes an algebra conversion unit for algebraically converting an inputted video signal, a wave filtering unit for separating the algebraically converted video signal into a low frequency signal and a high frequency signal, a low frequency coefficient mapping unit for generating a high level frequency signal and a low level frequency signal which are the outputs of the wave filtering unit and a low frequency enhancing coefficient based on a user's adjustment, a high frequency coefficient mapping unit for generating a high frequency enhancing coefficient which is in inverse proportion to the low frequency enhancing coefficient, a first multiplier for multiplying the low frequency signal and the low frequency enhancing coefficient, a low frequency signal processing compensation unit for receiving an output of the low frequency coefficient mapping unit and an output of the first multiplier, a second multiplier for multiplying the high frequency signal and the high frequency enhancing coefficient, a summing unit for summing an output of the low frequency amplifying compensation unit and an output of the second multiplier, and an exponential conversion unit for exponentially converting an output of the summing unit. The above-described construction is defined as a first feature of the present invention.

In the present invention, as a second feature of the present invention, the low frequency counting mapping unit generates a coefficient signal proportional to the size of the high frequency component of the input signal, and the size of the coefficient signal is varied by a low frequency level of the input video signal and is in inverse proportion to the average value of the input signal, and the coefficient is varied by an adjusting signal of a user.

As a third feature of the present invention, the low frequency amplifying mapping unit is determined by a minimum value and a maximum value of the input video signal range and a low frequency coefficient mapping unit.

As a fourth feature of the present invention, the high frequency coefficient mapping unit generates a signal which is inverse proportion to the low frequency coefficient mapping unit, and the size of the same is varied by an adjusting signal of a user.

As a fifth feature of the present invention, a minimum value is detected from an image signal, and the detected value is subtracted by a subtractor with respect to the image signal and is inputted into an algebra conversion unit, and an output of the exponential conversion unit is summed with the detected minimum value by the summing unit.

As a sixth feature of the present invention, the coefficient of the coefficient mapping unit is varied in accordance with an average value of the video signal inputted.

Figure 1:
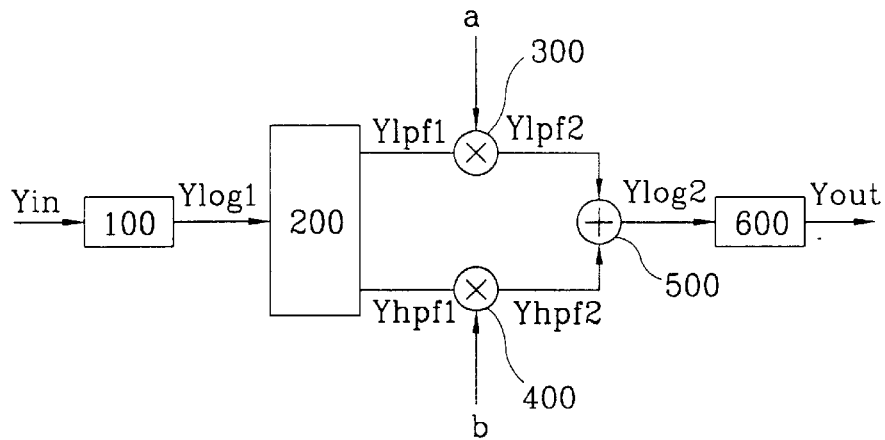
FIG. 1 is a view illustrating the construction of a conventional contrast enhancing apparatus for a video signal.
Figure 2:
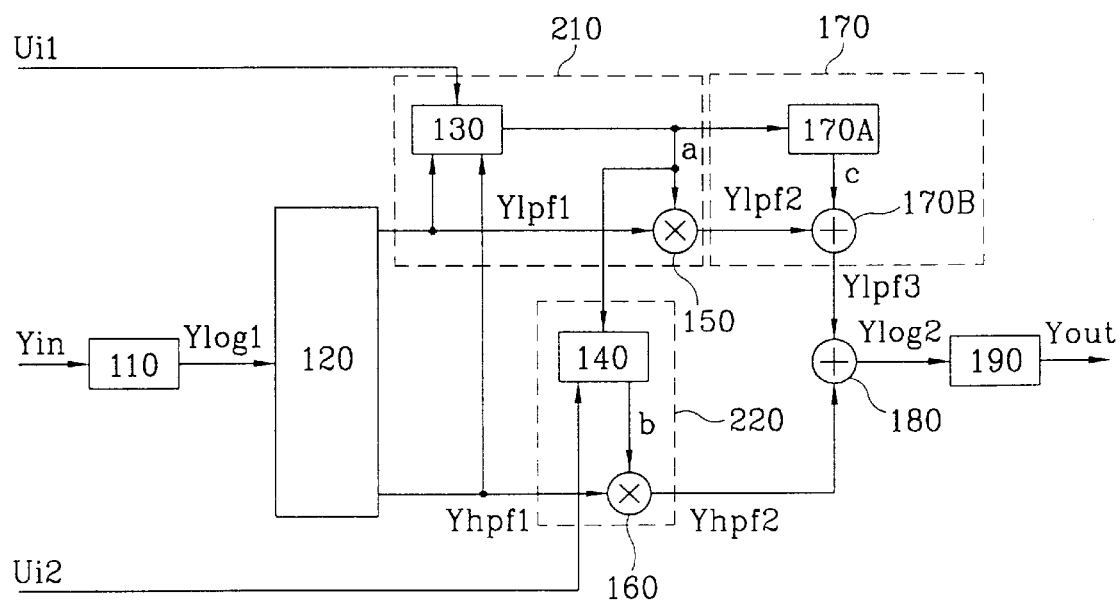
FIG. 2 is a view illustrating a contrast enhancing apparatus for a video signal according to a first embodiment of the present invention.

FIG. 2 illustrates a contrast enhancing apparatus for a video signal according to the present invention which includes an algebra conversion unit 110 for algebraically converting a video signal Yin, a wave filtering unit 120 for filtering the algebraically converted video signal Ylog1 and separating into a low frequency component Y1pf1 and a high frequency component Yhpf1, a low frequency coefficient mapping unit 130 for generating a low frequency enhancing coefficient "a" having a value varied based on the level of the low frequency component Y1pf1 and the level of the high frequency component Yhpf1, a high frequency coefficient mapping unit 140 for generating a high frequency enhancing coefficient "b" having a value which is in inverse proportion to the low frequency enhancing coefficient "a" generated by the low frequency coefficient mapping unit 130, a first multiplier 150 for multiplying to enhance (amplify or attenuate) the low frequency component Y1pf1 filtered by the wave filtering unit 120 based on a low frequency enhancing coefficient "a" generated by the low frequency coefficient mapping unit 130, a second multiplier 160 for multiplying to enhance the high frequency component Yhpf1 filtered by the wave filtering unit 120 based on the high frequency enhancing coefficient "b" generated by the high frequency coefficient mapping unit 140, a low frequency amplifying unit 170 for detecting a DC level compensation coefficient "c" from a relative enhancing value 1−a of the low frequency enhancing coefficient "a" generated by the low frequency mapping unit 130 and a central value log(Ymed) of the video signal and compensating a DC level of the enhanced low frequency component Y1pf2, a summing unit 180 for summing the low frequency component Y1pf1 having a DC level compensated by the low frequency amplifying unit 170 and a high frequency component Yhpf2 enhanced by the second multiplier 160, and an exponential conversion unit 190 for exponentially converting the signal Ylog2 summed by the summing unit 180 and outputting a recovered video signal Yout.

The low frequency mapping unit 130 outputs a low frequency enhancing coefficient "a" which is varied based on the levels of the low frequency component Y1pf1 and the high frequency component Yhpf1, and the outputted low frequency enhancing coefficient "a" is varied by a user control signal Ui1 for thereby uniformly varying the amplitude and the level of the low frequency component Y1pf1. The high frequency mapping unit 140 outputs a high frequency enhancing coefficient "b" which is in inverse proportion to the low frequency enhancing coefficient 'a", and the high frequency enhancing coefficient 'b" is varied by a user control signal Ui2 for thereby uniformly varying the amplitude and level of the high frequency component Yhpf1.

The low frequency amplifying unit 170 includes a low frequency amplifying mapping unit 170A for detecting a low frequency compensation coefficient "c" using a central value log(Ymed) of a video signal range with respect to the relative enhancing value 1−a of the low frequency enhancing coefficient "a" generated by the low frequency mapping unit 130, and a second summing unit 170B for compensating a low frequency level of the low frequency component Y1pf2 enhanced by the first multiplier 150 by the low frequency compensation coefficient "c" detected by the low frequency amplifying mapping unit 170A.

Figure 3:
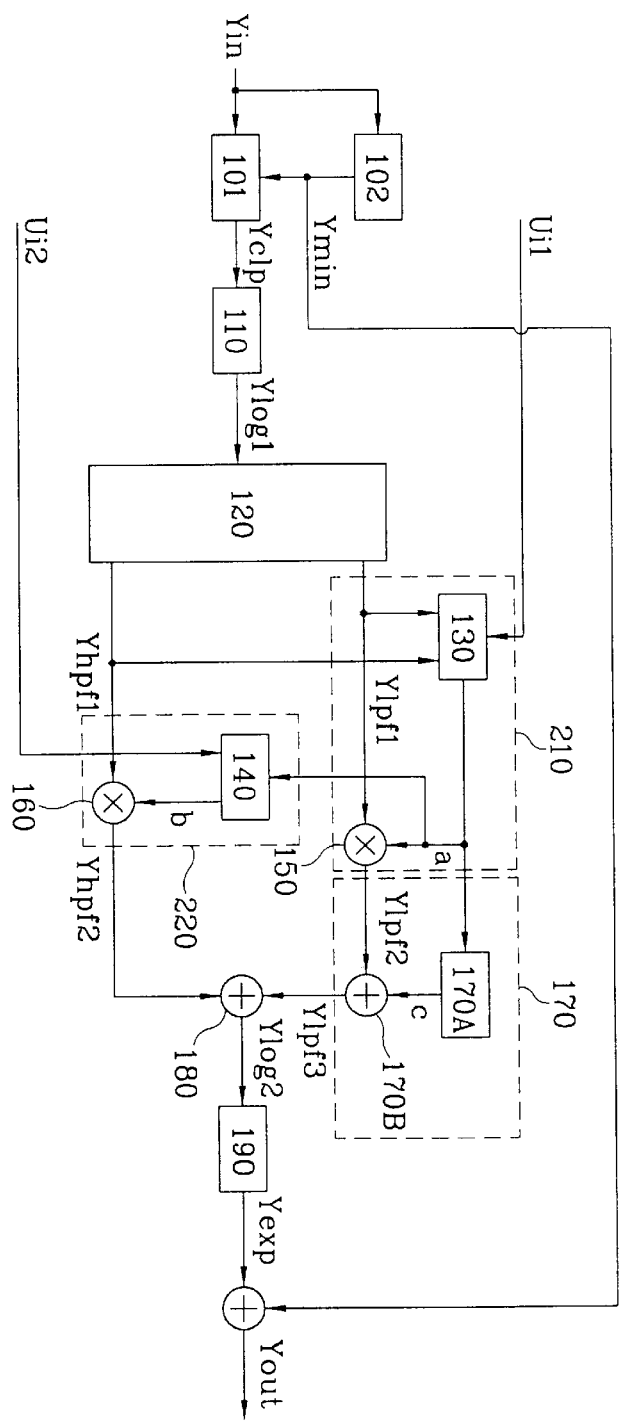
FIG. 3 is a view illustrating a contrast enhancing apparatus for a video signal according to a second embodiment of the present invention.

FIG. 3 illustrates a contrast enhancing apparatus according to another embodiment of the present invention. In this embodiment of the present invention, there are further provided a subtractor 101 for subtracting the inputted video signal Yin by a certain level, a minimum value detector 102 for detecting a minimum value of the inputted video signal Yin, and a third summing unit 191 for summing the values by the value subtracted by the subtractor 101, compared to the construction of FIG. 2.

Figure 4:
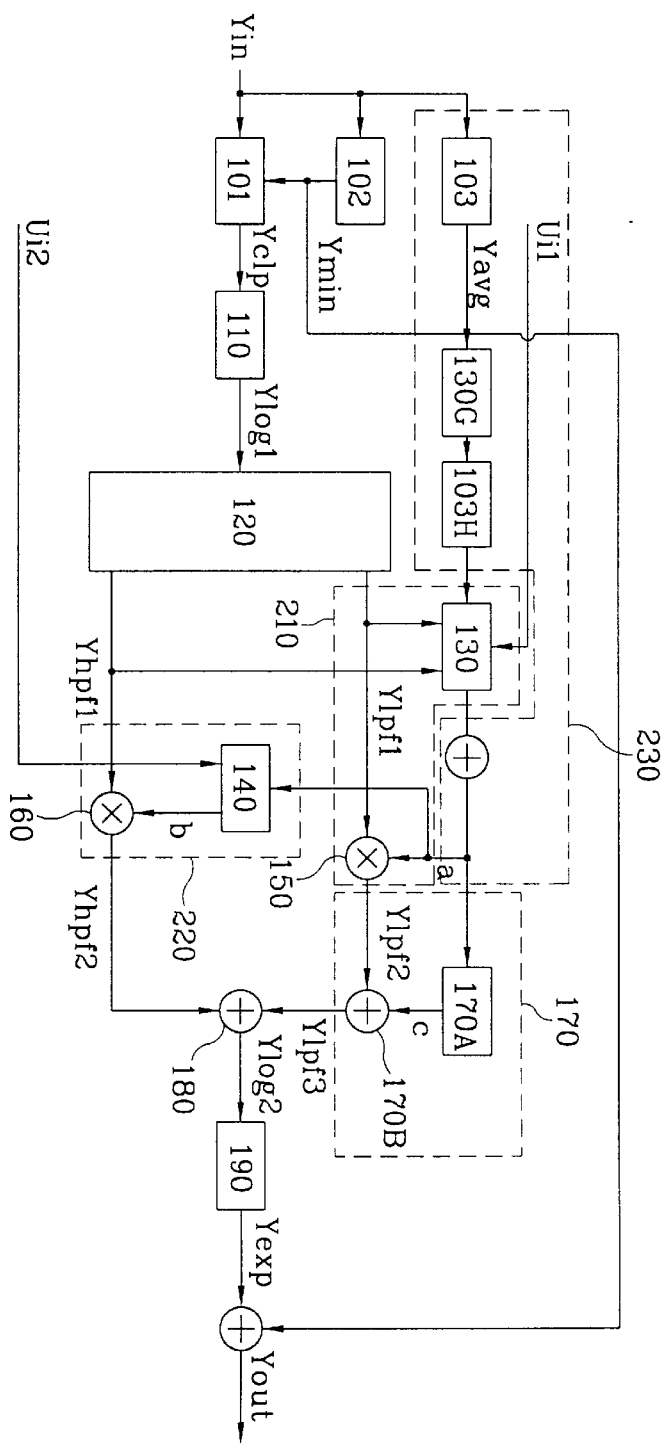
FIG. 4 is a view illustrating a contrast enhancing apparatus for a video signal according to a third embodiment of the present invention.
Figure 5:
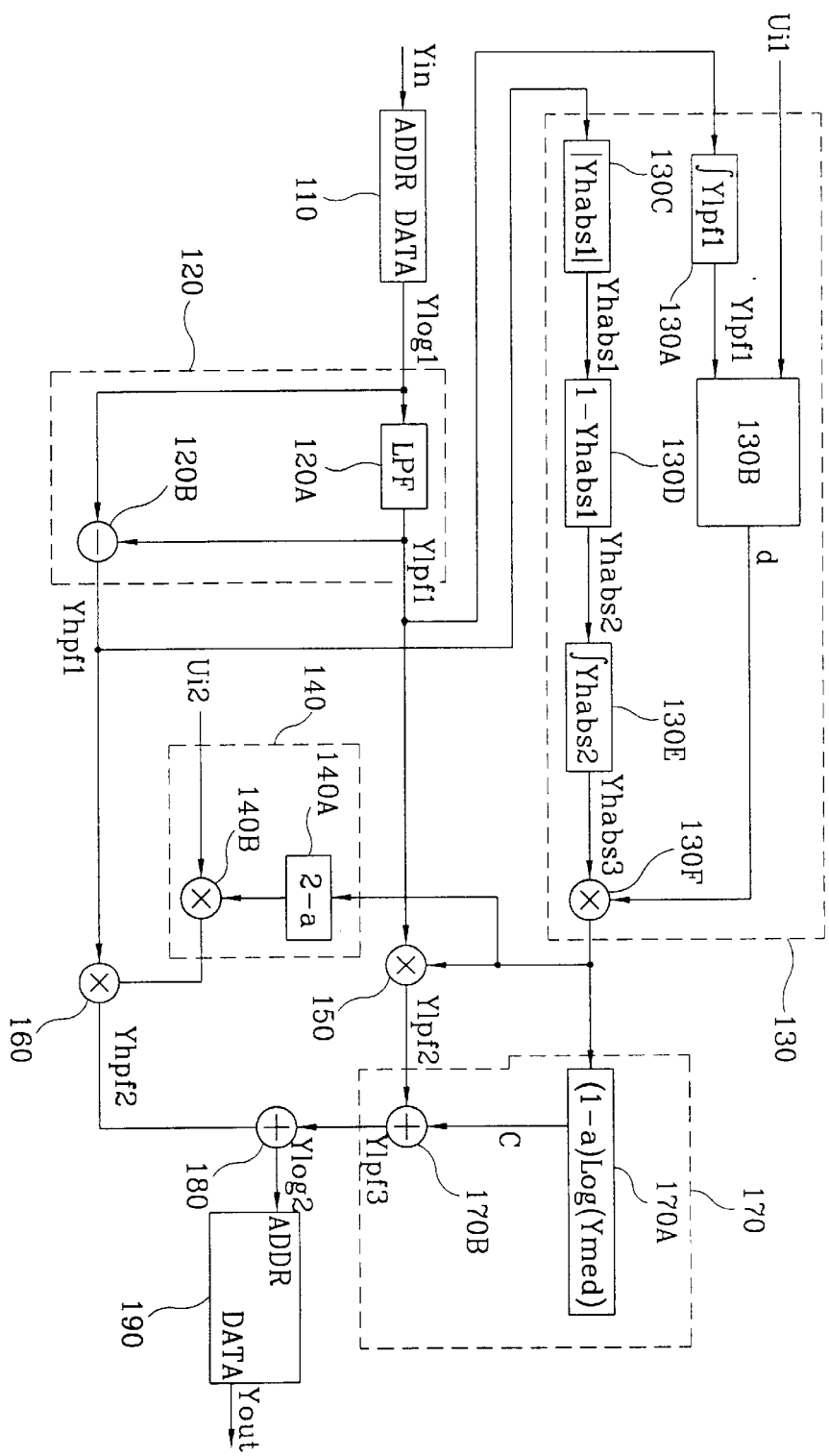
FIG. 5 is a block diagram illustrating a contrast enhancing apparatus for a video signal according to the present invention.

FIG. 4 illustrates a contrast enhancing apparatus according to another embodiment of the present invention. In this embodiment of the present invention, there is further provided a meaning unit 102 for meaning the inputted video signal Yin, compared to the construction of FIG. 3, FIG. 5 is a detailed block diagram of FIG. 2. The algebraical conversion unit 110 stores an algebraically converted value using a ROM and outputs an algebraically converted signal Ylog1 which is a data value corresponding to an address ADDR of the input video signal Yin, and the wave filter 120 includes a low pass filter(LPF) 120A for filtering an algebraically converted video signal Ylog1 and outputting a low frequency component Y1pf1, and a first subtractor 120B for subtracting the low frequency component Y1pf1 from the algebraically converted video signal Y1log1 and outputting a high frequency component.

In addition, the low frequency mapping unit 130 includes a first integrator 130A for integrating to detect the level of the low frequency component Y1pf1, a coefficient generation unit 130B for generating a low frequency coefficient "d" which is varied in accordance with the level of the integrated low frequency component Y1pf1 and an off-set value based on a user control signal Ui1, a high frequency size detector 130C for obtaining an absolute value of the high frequency component Yhpf1 and detecting a size Yhabs1 of the same, a second subtractor 130D for subtracting to detect a relative size Yhabs2 of the high frequency component Yhabs1 detected by the high frequency size detector 130C, a second integrator 130E for integrating to detect the level of the high frequency component subtracted by the second subtractor 130D, and a third multiplier 130F for multiplying a high frequency component level Yhabs3 integrated by the second integrator 130E and a low frequency coefficient "d" generated by the coefficient generation unit 130B and generating a low frequency enhancing coefficient "a".

The high frequency coefficient mapping unit 140 includes a fourth multiplier 140B for multiplying a value subtracted by the third subtractor 140A which outputs a value subtracted from the maximum variable range of the low frequency enhancing coefficient "a" outputted from the third multiplier 130F and a user control signal Ui2 and generating a high frequency enhancing coefficient "b".

In addition, the exponential conversion unit 190 stores an exponentially converted data using the ROM, search an address ADDR of the signal Ylog2 summed by the summing unit 180, and outputs an exponentially converted video signal which is a corresponding data.

The operation of the present invention will be explained with reference to FIG. 2.

The input video signal Yin is inputted into the algebraical conversion unit 110 and is converted into an algebra(log function), and this algebraically converted video signal Ylog1 is inputted into the wave filtering unit 120, and the wave filtering unit 120 separates the inputted video signal into a log frequency component Y1pf1 and a high frequency component Yhpf1.

In addition, the low frequency component Y1pf1 separated by the wave filtering unit 120 is inputted into the low frequency coefficient mapping unit 130 and the first multiplier 150, respectively, and the high frequency component Yhpf1 is inputted into the coefficient mapping unit 130 and the second multiplier 160, respectively.

At this time, the coefficient mapping unit 130 generates a low frequency enhancing coefficient "a" which is varied based on the levels of the low frequency component Y1pf1 and the high frequency component Yhpf1 and enhances the low frequency component Y1pf1 inputted into the first multiplier 150 for thereby outputting the enhanced low frequency component Y1pf2.

The low frequency coefficient mapping unit 130 uniformly varies the low frequency enhancing coefficient "a" by the off-set value based on a user control signal.

If the low frequency enhancing coefficient is in a range of a>0, $0.5 \leq a \leq 1.5$, when a=1, the low frequency component Y1pf1 is not enhanced, and when a=1.5, the low frequency component Y1pf1 is amplified 1.5 times, and when a=0.5, the low frequency component Y1pf1 is attenuated 0.5 times.

The low frequency enhancing coefficient "a" generated by the low frequency coefficient mapping unit 130 is inputted into the high frequency coefficient mapping unit 140 and the low frequency amplifying compensation unit 170, respectively.

The high frequency mapping unit 140 generates a high frequency enhancing coefficient "b" which is in inverse proportion to the inputted low frequency enhancing coefficient "a", and the thusly generated high frequency enhancing coefficient "b" is uniformly varied by the off-set value in accordance with a user control signal.

The high frequency enhancing coefficient "b" generated by the high frequency mapping unit 140 enhances the high frequency component Yhaf1 inputted into the second multiplier 160 and varies the level and amplitude of the high frequency component Yhpf2 in accordance with a user control signal Ui2.

Here, if the high frequency enhancing coefficient is in a range of b>0, $0.5 \leq b \leq 1.5$, when b=1, the low frequency component Y1pf1 is not enhanced, and when b=1.5, the low frequency component Y1pf1 is amplified 1.5 times, and when b=0.5, the low frequency component Y1pf1 is attenuated 0.5 times.

The thusly generated low frequency enhancing coefficient "a" enhances the low frequency component Y1pf1 inputted into the first multiplier 150 by "a"-times based on the low frequency component Y1pf1 and the high frequency component Yhpf1, and the since the high frequency enhancing coefficient "b" is in inverse proportion to the low frequency enhancing coefficient "a", the high frequency component Yhpf1 inputted; into the second multiplier 160 is enhanced by b-times.

In addition, in order to compensate the DC level of the low frequency component Y1pf2, the low frequency amplifying mapping unit 170A of the low frequency amplifying compensation unit 170 detects a relative enhancing value 1−a with respect to the inputted low frequency enhancing coefficient "a" and multiplies the thusly detected value and the central value log(Ymed) of the video signal range for thereby generating a low frequency amplifying compensation coefficient "c". Namely, $c=(1-a)(\log(Ymed))$.

The low frequency amplifying compensation coefficient "c" compensates the DC level transition based on the enhanced low frequency component Y1pf2.

Namely, when the low frequency enhancing coefficient "a" is 1, since the low frequency component Y1pf1 is not enhanced, the low frequency amplifying compensation coefficient "c" is 0, and if the low frequency enhancing coefficient "a" is higher than 1, the relative enhancing value 1−a has a negative value, the DC level of the low frequency component Y1pf2 amplified by the DC level compensation coefficient "c" is decreased. If the low frequency enhancing coefficient "a" is smaller than 1, the relative enhancing value 1−a has a positive value, the DC level of the low frequency component Y1pf2 amplified by the DC level compensation coefficient "c" is increased.

Therefore, the DC level compensation coefficient "c" detected by the low frequency amplifying compensation unit 170 finally compensates the DC level of the low frequency component Y1pf2 enhanced by the first multiplier 150. The thusly compensated low frequency component Y1pf3 is inputted into the first summing unit 180.

The summing unit 180 sums a low frequency component Y1pf3 outputted from the low frequency amplifying compensation unit 170 and a high frequency component Yhpf2 enhanced by the second multiplier 160, and the thusly summed signal Ylog1 is exponentially converted by the exponential conversion unit 190.

FIG. 3 illustrates another embodiment of the contrast enhancing apparatus according to the present invention. In this embodiment of the present invention, the minimum value is detected by the inputted video signal and is subtracted from the video signal by the subtractor, and a resultant value is inputted into the algebraical conversion unit. The output of the exponential conversion unit is summed with the minimum value detected by the summing unit. The description of the same elements as the construction of FIG. 2 will be omitted.

The minimum value detector 102 detects a minimum value of the input video signal Yin, and the thusly detected minimum value is transferred to the subtractor 101. The subtractor 101 the minimum value detected by the minimum value detector 102 from the input video signal Yin, and an output signal Yclp is transmitted to the algebraical conversion unit 110. In addition, the value is summed by the summing unit as much as the value that the original video signal Yexp which is an output signal of the exponential conversion unit 190 is subtracted from the input video signal Yin by transmitting the value to the third summing unit 191 for thereby outputting a recovering video signal Yout.

In addition, assuming that the maximum value of the video signal range is Ymax, an equation of c=(1−a)log (Ymax) is obtained. At this time, the minimum value of the video signal is "0" by the subtractor 101 connected with the input video signal Yin, the value "c" is not affected.

FIG. 4 illustrates another embodiment of the contrast enhancing apparatus according to the present invention. As shown therein, in addition to the construction of FIG. 3, a low frequency processing level adjusting unit 230 is further provided for analyzing an input video signal and adjusting an output level of the low frequency processing unit.

The low frequency processing level adjusting unit 230 outputs an adjusting coefficient "a", which is obtained by adjusting the level of an adjusting coefficient Ya from the low frequency coefficient mapping unit 130 in accordance with a mean signal, by summing and subtracting a certain level corresponding to the mean level by computing a mean value of the input video signal. Namely, when the mean value is high, the value "a" is decreased, and when the mean value is low, the value "a" is increased, so that it is possible to obtain the value "a" which is adaptiye to the mean value.

The input video signal Yin generates a signal Ylog1 which is algebraically converted by the algebraical conversion unit 110, and the thusly generated signal is outputted to the wave filtering unit 120. The algebraical conversion unit 110 stores the algebraically converted value into a ROM, and the signal Ylog1 which is algebraically converted as a signal Yclip outputted from the subtractor 101 is applied to an address of the ROM is outputted based on the data of the ROM. The wave filtering unit 120 outputs a high frequency signal Yhpf1 that the low frequency signal Y1pf1 is subtracted from the low frequency signal Y1pf1 and the algebraically converted signal Ylog1.

Figure 6:
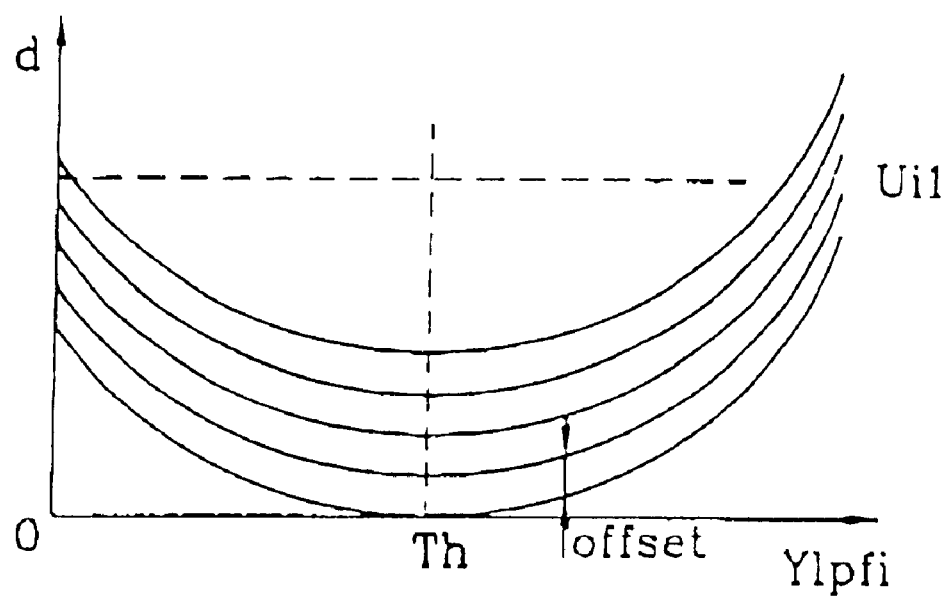
FIG. 6 is a graph of a variation of a low frequency coefficient based on an integrated video signal and a variation of a user control signal at a video signal coefficient generator according to the present invention.

The low frequency signal Y1pf1 and the high frequency signal Yhpf1 which are outputted from the wave filtering unit are applied to the low frequency coefficient mapping unit 130. As shown in FIG. 6, in the construction of the low frequency coefficient mapping unit, in order to detect the amount of the high frequency component among the signal components, the value 1−Yhabs1 is computed by the ABS unit 130C and the relative detector 130D. When the value Yhabs2 is outputted, an integrated value is obtained by the integrator 130E for thereby outputting a value Yhabs3.

In addition, in order to detect the amount of the low frequency component, a signal Y1pf1 that the low frequency Y1pf1 is integrated by the integrator 130A is outputted. The user control signal Ui1 and the thusly integrated signal Y1pf1 are inputted into the coefficient generator 130B for thereby outputting a signal "d". An interrelationship between the coefficient "d" outputted from the coefficient generator 130B and the user control signal Ui1 and the integrated signal Y1pf1 is shown in FIG. 6.

The output signal Yhabs3 of the integrator 130E and the coefficient "d" outputted from the coefficient generator 130B becomes a signal Ya by the multiplier. In the low frequency processing level adjusting unit 230, the mean unit 103 computes a mean value of the input video signal, and the algebraical conversion unit 130G algebraically converts the output signal Yavg of the mean unit 103. The output Ylogavg of the algebraical conversion unit is applied to the level shifter 130H for thereby outputting a level-shifted signal Ylavgs.

The signal Ya subtracts the level-shifted signal Ylavgs for thereby obtaining a low frequency amplifying coefficient "a".

FIG. 5 illustrates a detailed construction of the circuit of FIG. 2.

The algebraical conversion unit 110 stores the algebraically converted value using the ROM for implementing a real time process. When the video signal Yin is applied to the address ADDR of the ROM, a corresponding data is searched and is outputted as an algebraically converted video signal Ylog1.

In addition, the wave filtering unit 120 filters the algebraically converted video signal Ylog1 using the low pass filter(LPF) 120A and outputs a low frequency component Y1pf1, and the filtered low frequency component Y1pf1 is subtracted from the algebraically converted video signal Y1 by the first subtractor 120B for thereby outputting a high frequency component Yhpf1.

The thusly separated low frequency component Y1pf1 is inputted into the coefficient mapping unit 130 and the first multiplier 150, and the high frequency component Yhpf1 is inputted into the coefficient mapping unit 130 and the second multiplier 160.

The coefficient mapping unit 130 detects the levels of the low frequency component Y1pg1 and the high frequency component Yhpf1 and outputs a low frequency enhancing coefficient "a". The first integrator 130A of the coefficient mapping unit 130 integrates the low frequency component Y1pf1 and detects the level of the same and outputs to the coefficient generator 130B. The coefficient generator. 130B outputs a low frequency coefficient "d" in accordance with the level of the integrated low frequency component Y1pf1.

At this time, the coefficient generation unit 130B varies the low frequency coefficient "d" by the off-set value of FIG. 6 in accordance with a user control signal Ui1.

Namely, as shown in FIG. 6, the low frequency coefficient "d" outputted from the coefficient generation unit 130B has a minimum value at a threshold value of the integrated low frequency component Y1pf1 and has a large value in the case that the same is relatively larger or smaller than the threshold value Th. The low frequency coefficient "d" is uniformly varied by the off-set value in accordance with a user control signal Ui2.

At this time, the coefficient generation unit 130B varies the low frequency coefficient "d" by the off-set value as shown in FIG. 6 by a user control signal Ui1.

Namely, as shown in the graph of FIG. 6, the low frequency coefficient "d" outputted from the coefficient generation unit 130B has a minimum value at a threshold value of the integrated low frequency component Y1pf1, and in the case that the low frequency coefficient "d" is relatively larger than or smaller than the threshold value Th, the low frequency coefficient "d" is uniformly varied by the off-set value by the user control signal Ui2.

A high frequency size detector 130C which receives a high frequency component Yhpf1 has an absolute value |Yhpf1| of the high frequency component yhpf1 and detects the size Yhabs1, and the thusly detected size is subtracted (1−Yhabs1) from the second subtractor 130D for thereby detecting a relative size Yhabs2. The thusly subtracted value is integrated by the second integrator 130E, and a relative level Yhabs3 of the high frequency component Yhpf1 is detected.

The relative levels of the low frequency coefficient "d" and the high frequency component Yhpf1 are multiplied by the multiplier 130E and are outputted to the first multiplier as a low frequency enhancing coefficient "a", so that the low frequency component Y1pf1 is enhanced(amplified or attenuated) by a coefficient "a" which is varied based on the levels of the low frequency component Y1pf1 and the high frequency component Yhpf1.

The third subtractor of the high frequency mapping unit 140 which receives a low frequency enhancing coefficient "a" subtracts the low frequency enhancing coefficient "a" from the maximum varying range (2:0.5≦a≦1.5) of the low frequency enhancing coefficient "a", and the multiplier 140B multiplies by the off-set value in accordance with a user control signal and outputs a high frequency enhancing coefficient "b".

Namely, the subtraction is performed using "2−a" based on the low frequency enhancing coefficient "a", and a high frequency enhancing coefficient "b" which is in inverse proportion to the low frequency enhancing coefficient "a", and the high frequency enhancing coefficient "b" is varied by the off-set value based on a user control signal Ui2, and the level of the amplitude of the enhanced high frequency component Uhpf2 are varied.

The high frequency enhancing coefficient "b" enhances the high frequency component inputted into the second multiplier 150, and the thusly enhanced high frequency component Yhpf2 is inputted into the first summing unit 180.

In addition, the low frequency component Y1pf2 which is enhanced by the first multiplier 150 by the low frequency enhancing coefficient "a" of the coefficient mapping unit 130 is inputted into the first summing unit 180 as a low frequency component Y1pf3 in which the low frequency level is compensated by the relative enhancing value by the low frequency amplitude compensation unit 170. Namely, a difference value between the low frequency amplitude maximum value obtained when the low frequency component Y1pf1 passes through the first multiplier 150 and the maximum value of the video signal is compensated by the second summing unit 170B.

The first summing unit 180 outputs a signal Ylog2 that the low frequency component Y1pf3 which is low-frequency-compensated by the low frequency amplitude compensation unit 170 and the high frequency component Yhpf2 enhanced by the second multiplier 160 to the exponential conversion unit 190.

The exponential conversion unit 190 stores the value, which will be exponentially converted, using the ROM for a real time process of the algebraically converted video signal and searches a corresponding data when the algebraically converted video signal Ylog2 is applied to the address ADDR of the ROM and outputs the searched data as an exponentially converted video signal Yout.

Therefore, in order to enhance the filtered low frequency component, the low frequency enhancing coefficient "a" which is varied in accordance with the high frequency component Yhpf1 and the low frequency component Y1pf1, is determined, and the inversely proportional high frequency enhancing coefficient "b" is determined based on the thusly determined coefficient "a".

In order to prevent a transition of the enhanced low frequency component Y1pf1, the low frequency level of the finally filtered low frequency component Y1pf2 is compensated using the low frequency level compensation coefficient "c" with respect to the relative enhancing value 1−a of the low frequency enhancing coefficient "a" and the central value log(Ymed) of the video signal.

In addition, in order to prevent a saturation of the low frequency component Y1pf1 and the high frequency component Yhpf1, the level and amplitude of the same are varied using the user control signals Ui1 and Ui2.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A contrast enhancing apparatus for a video signal, comprising:

an algebraical converter for algebraically converting an inputted video signal;

a wave filter for separating the algebraically converted video signal into a low frequency signal and a high frequency signal;

a low frequency coefficient mapping unit for generating a level of a high frequency signal which is an output of the wave filtering unit and a level of the low frequency signal and a low frequency enhancing coefficient based on a user's adjustment;

a high frequency coefficient mapping unit for generating a high frequency enhancing coefficient which is in inverse proportion to the low frequency enhancing coefficient;

a first multiplier for multiplying the low frequency signal and the low frequency enhancing coefficient;

a low frequency signal processing compensation unit for receiving an output of the low frequency mapping unit and an output of the first multiplier and compensating a low frequency level;

a second multiplier for multiplying the high frequency signal and the high frequency enhancing coefficient;

an adder for summing an output of the low frequency amplifying compensation unit and an output of the second multiplier; and an exponential converter for exponentially converting an output of the summing unit.

2. A contrast enhancing apparatus for a video signal, comprising:

an algebraical converter for algebraically converting an inputted video signal;

a wave filter for separating the algebraically converted video signal into a low frequency component and a high frequency component;

a low frequency signal processing unit for enhancing a low frequency output of the wave filtering unit;

a high frequency signal processing unit for enhancing a high frequency output of the wave filtering unit;

a low frequency signal processing compensation unit for compensating an output of the low frequency signal processing unit;

an adder for summing a low frequency signal compensated by the low frequency signal processing compensation unit and a high frequency signal; and an exponential converter for exponentially converting the signal summed by the summing unit.

3. The apparatus of claim 2, wherein said low frequency signal processing unit includes:

a low frequency coefficient mapping unit for generating a low frequency enhancing coefficient which is varied based on the levels of the high frequency component and the low frequency component and enhancing the low frequency component; and a multiplier for multiplying a low frequency component outputted from the wave filtering unit and an output from the low frequency coefficient mapping unit.

4. The apparatus of claim 2, wherein said high frequency signal processing unit includes:

a high frequency coefficient mapping unit for generating a high frequency enhancing coefficient which is in inverse proportion to the low frequency enhancing coefficient and enhancing a high frequency component; and a multiplier for multiplying a high frequency component from the wave filtering unit and an output of the high frequency coefficient mapping unit.

5. The apparatus of claim 1, wherein said low frequency signal processing compensation unit includes:

a low frequency amplifying mapping unit for detecting a low frequency level compensation coefficient from a low frequency enhancing coefficient generated by the low frequency component enhancing unit and a central value of a video signal range; and an adder for summing the amplified low frequency component.

6. The apparatus of claim 2, wherein said low frequency signal processing compensation unit includes:

a low frequency amplifying mapping unit for detecting a low frequency level compensation coefficient from a relative enhancing value of the low frequency enhancing coefficient generated by the low frequency component enhancing unit and a central value of the video signal range; and a summing unit for summing the amplified low frequency component.

7. The apparatus of claim 1, wherein said low frequency coefficient mapping unit includes:

a first integrator for integrating to detect a level of the filtered low frequency component;

a frequency generation unit for generating a low frequency coefficient which is varied based on a level of the integrated low frequency component and a user control signal;

a high frequency size detection unit for obtaining an absolute value of the filtered high frequency component and detecting the size of the same;

a subtractor for subtracting to detect a level related to the size of the high frequency component detected by the high frequency size detection unit;

a second integrator for integrating to detect a level of the high frequency component subtracted by the summing unit; and a multiplier for multiplying a detection level of the second integrator and a low frequency coefficient generated by the coefficient generation unit for thereby generating a low frequency enhancing coefficient.

8. The apparatus of claim 1, wherein said high frequency coefficient mapping unit includes:

a subtractor for subtracting the low frequency enhancing coefficient with respect to the maximum variable range of the low frequency enhancing coefficient outputted from the low frequency coefficient mapping unit to detect a high frequency enhancing coefficient which is in inverse proportion to the low frequency enhancing coefficient; and a multiplier for multiplying the value subtracted by the subtractor and a user control signal and generating a high frequency enhancing coefficient.

9. The apparatus of claim 1, wherein a low frequency enhancing coefficient generated by the low frequency coefficient mapping unit and a high frequency enhancing coefficient generated by the high frequency coefficient mapping unit are uniformly varied by the off-set value based on a user control signal for thereby varying the amplitude and level of the low frequency component and high frequency component.

10. The apparatus of claim 1, wherein the low frequency coefficient and high frequency enhancing coefficient are non-linear and have an opponent relationship.

11. A contrast enhancing apparatus for a video signal, comprising:

a minimum value detection unit for detecting a minimum value of an input video signal;

a subtractor for subtracting the minimum value detected by the minimum value detection unit from the input video signal;

a video signal enhancing unit for enhancing the input video signal; and an adder for summing an output of the video enhancing unit and the minimum value.

12. The apparatus of claim 10, wherein said video signal enhancing processing unit includes a homomorphic filter.

13. The apparatus of claim 10, wherein said video signal processing enhancing unit includes:
    an algebraical convertert for algebraically converting the input video signal;
    a wave filter for filtering the input video signal by the band width;
    a band width processing unit for detecting the output of the wave filtering unit by the band width;
    an adder for summing the outputs of the band width processing unit; and
    an exponential conversion unit for exponentially converting an output signal of the summing unit.

14. A contract enhancing apparatus for a video signal, comprising:
    an algebraical converter for algebraically converting a video signal inputted;
    a wave filter for separating the algebraically converted video signal into a low frequency component and a high frequency component;
    a low frequency signal processing unit for enhancing a low frequency output of the wave filtering unit;
    a high frequency signal processing unit for enhancing a high frequency output of the wave filtering unit;
    a low frequency signal processing level adjusting unit for analyzing the inputted video signal and adjusting an output level of the low frequency signal processing unit;
    a low frequency signal processing compensation unit for compensating an output of the low frequency signal processing unit;
    an adder for summing a low frequency signal and a high frequency signal compensated by the low frequency signal processing compensation unit; and
    an exponential conversion unit for exponentially converting the signals summed by the summing unit.

15. The apparatus of claim 14, wherein said low frequency processing level adjusting unit includes a meaning unit, an algebraical conversion unit, a level shifter, and a summing unit.

* * * * *